(12) United States Patent
Maurel

(10) Patent No.: US 8,220,348 B2
(45) Date of Patent: Jul. 17, 2012

(54) UNDER TRAVEL ACTUATOR, PARTICULARLY FOR AUTOMOBILE CLUTCH

(75) Inventor: Hervé Maurel, Amiens (FR)

(73) Assignee: Valeo Embrayages, Amiens Cedex (FR)

( * ) Notice: Subject to any disclaimer, the term of this patent is extended or adjusted under 35 U.S.C. 154(b) by 946 days.

(21) Appl. No.: 12/296,342

(22) PCT Filed: May 22, 2007

(86) PCT No.: PCT/FR2007/051311
§ 371 (c)(1),
(2), (4) Date: Oct. 10, 2008

(87) PCT Pub. No.: WO2007/138216
PCT Pub. Date: Dec. 6, 2007

(65) Prior Publication Data
US 2009/0282934 A1 Nov. 19, 2009

(30) Foreign Application Priority Data
May 29, 2006 (FR) ...................................... 06 51935

(51) Int. Cl.
*F16H 1/20* (2006.01)
(52) U.S. Cl. ............................ 74/89.27; 74/127; 192/97

(58) Field of Classification Search ................. 74/89.31, 74/89.34, 89.29, 89.27, 89.35, 127; 192/70.251, 192/70.26, 94, 97
See application file for complete search history.

(56) References Cited

U.S. PATENT DOCUMENTS

| | | | | |
|---|---|---|---|---|
| 4,137,784 | A | * | 2/1979 | Griffin ......................... 74/89.37 |
| 4,878,396 | A | * | 11/1989 | Grunberg ........................ 74/518 |
| 5,135,090 | A | | 8/1992 | Bertin et al. |
| 5,910,692 | A | * | 6/1999 | Saeda et al. ...................... 310/13 |
| 5,954,178 | A | | 9/1999 | Fischer et al. |
| 6,513,398 | B1 | * | 2/2003 | Finkemeyer ................. 74/89.28 |
| 2004/0020741 | A1 | * | 2/2004 | Kapaan et al. ............... 192/84.6 |
| 2006/0032721 | A1 | * | 2/2006 | Langwald ................... 192/85 C |

FOREIGN PATENT DOCUMENTS

| | | |
|---|---|---|
| FR | 2 663 887 | 1/1992 |
| WO | WO 2005/028900 | 3/2005 |

\* cited by examiner

*Primary Examiner* — Robert Pezzuto
*Assistant Examiner* — Matthew D Troutman
(74) *Attorney, Agent, or Firm* — Berenato & White, LLC

(57) ABSTRACT

An under travel actuator, particularly intended for an automobile clutch, including an engine (12) for the translation movement of a mobile gear (14) acting on a push stem (16) for the opening and closing of the clutch, the mobile gear including screw-nut means (22, 24) cooperating with two combined means of unidirectional driving in order to regulate the length of the push stem (16) according to the wear of the clutch surfaces subject to friction.

11 Claims, 4 Drawing Sheets

UNDER TRAVEL ACTUATOR, PARTICULARLY FOR AUTOMOBILE CLUTCH

CROSS-REFERENCE TO RELATED APPLICATIONS AND CLAIM TO PRIORITY

This application relates to International Application No. PCT/FR2007/051311 filed May 22, 2007 and French Patent Application No. 0651935 filed May 29, 2006, of which the disclosures are incorporated herein by reference and to which priority is claimed.

BACKGROUND OF THE INVENTION

1. Field of the Invention

The invention concerns a travel compensation actuator, in particular for a motor vehicle clutch.

2. Description of Related Art

An actuator of this type comprises an electrical reduction motor, which operates a driving mechanism, such as for example, a pusher member acting directly or otherwise on the system to be operated, for example, a clutch pressure plate.

If the actuator is of the effort compensating type, it will generally comprise a compensating spring, which acts on a cam or an inclined ramp that is connected to the said driving mechanism so as to apply a force to this mechanism in a particular direction representing the opening of the clutch and which approximately compensates the resistance manifested by the return spring of the clutch pressure plate in such a way that effort delivered by the reduction motor for the actuation of the clutch is reduced to a minimum.

When the friction linings of the clutch start to show signs of wear, the pressure plate and thereby also the driving mechanism become displaced as a result of the modification to the travel of this element and by changes in the amount of effort needed to operate its respective actions.

Numerous systems have already been proposed to compensate wear in such mechanisms and in general these are integrated into the clutch system itself in order to compensate wear of friction linings as it occurs, so that the wear has no immediate effect on the position of the clutch pressure plate or on the travel of the driving mechanism.

However, these known solutions are all relatively complex and in practice their precision and their reliability have frequently been found wanting.

Another solution consists in adjusting the length of the driving mechanism in relation to the amount of wear shown by the linings of the clutch in such a way that this adjustment of the length has the effect of compensating the travel of the pressure plate as it becomes affected by the wear to the linings.

BRIEF SUMMARY OF THE INVENTION

The aim of the present invention is, in particular, to respond to this need in a simple, effective and economic manner.

It has, as its object, a travel compensation actuator, applicable in particular to the operating mechanism of a motor vehicle clutch system and comprises the means of adjusting the length of the driving mechanism in such a manner as to allow compensation of the wear sustained by the friction linings of the clutch.

To this end, it proposes a travel compensation actuator, in particular for a motor vehicle clutch system, comprising a driving mechanism and a motorised means of operating the said driving mechanism over both outward and return travel, characterised in that it also comprises:

means of travel compensation, connecting the motor to the driving mechanism, which can be moved by the motor along an adjusted course and along a course of travel of the driving mechanism, with such means of compensation comprising an organ for the adjustment of a bearing block of the said drive mechanism;

and two combined means of unidirectional travel, which are carried by the casing of the actuator and which operate in conjunction with the adjustment organ to advance it by one step in one direction or the other, when the compensation means are displaced in one direction or the other respectively from an intermediary position from their adjustment travel.

In this way, according to the present invention, the means of travel compensation, especially in cases where worn friction linings of a clutch have to be compensated, are incorporated in the actuator and not in the clutch mechanism itself, and are thus exposed to much lower stress levels, thereby improving their operating reliability and precision.

According to a further characteristic of the invention, the means of travel compensation comprise a slide element, the movement of which is guided in the casing of the actuator and operated by the motor along the aforementioned adjustment and drive travel sections, and a screw-nut arrangement carried by the slide element with the screw forming the drive stop of the driving mechanism, being guided in its movement and immobilised while rotating in the slide element, with the nut being screwed onto the screw and guided in rotation and comprising an external toothing working in conjunction with the two combined means of unidirectional travel when the slide element is dispaced along its adjustment path.

In a preferred embodiment of the present invention, the combined means of unidirectional driving comprise two rings mounted in a rotating manner in the slide element and displaying an internal toothing arrangement intended to work in conjunction with the external toothing of the nut, with these two rings being associated with elastic means of return, which subject them to a rotational stress in opposing directions so as to bring them up against the stops The internal toothing of the two rings is in the form of a very open V and comprises a first part arranged obliquely in relation to the axis of the ring and a second part, which is parallel to the axis of the ring, with the oblique parts of the teeth of one of the rings being parallel to the oblique parts of the teeth of the other ring and orientated in the opposing direction.

The outer teeth of the nut are in the shape of a diamond and have two faces that are parallel with the axis of the nut and two faces that are obliquely arranged in relation to the axis of the nut, with these obliquely arranged faces being parallel with the oblique faces of the internal teeth of the rings.

The oblique faces of the teeth in the rings and in the nut are parallel with the thread of the screw and orientated in the same direction.

Preferably, in order to increase the length of the driving mechanism, the slide element is displaced in the direction of the return of the clutch.

In one embodiment of the invention, the adjustment and drive paths of the means of compensation are arranged end to end. As an alternative, they may partially overlap.

In one interesting embodiment, the actuator is of the effort compensating type and comprises at least one compensating spring, which acts through the intermediary of an organ rolling along a cam or an inclined ramp, which is connected to the driving mechanism, in the direction representing the opening of the clutch.

In a general fashion, the actuator in accordance with the present invention is applicable not only to the operation of a clutch, but also to the operation of a gearbox or a braking system within a motor vehicle.

BRIEF DESCRIPTION OF THE SEVERAL VIEWS OF THE DRAWINGS

The invention will be better understood and other characteristics, details and advantages of the invention will become apparent on reading the following description, which is given by way of example together with a number of drawings, in which.

DETAILED DESCRIPTION OF THE INVENTION

Figure 1:
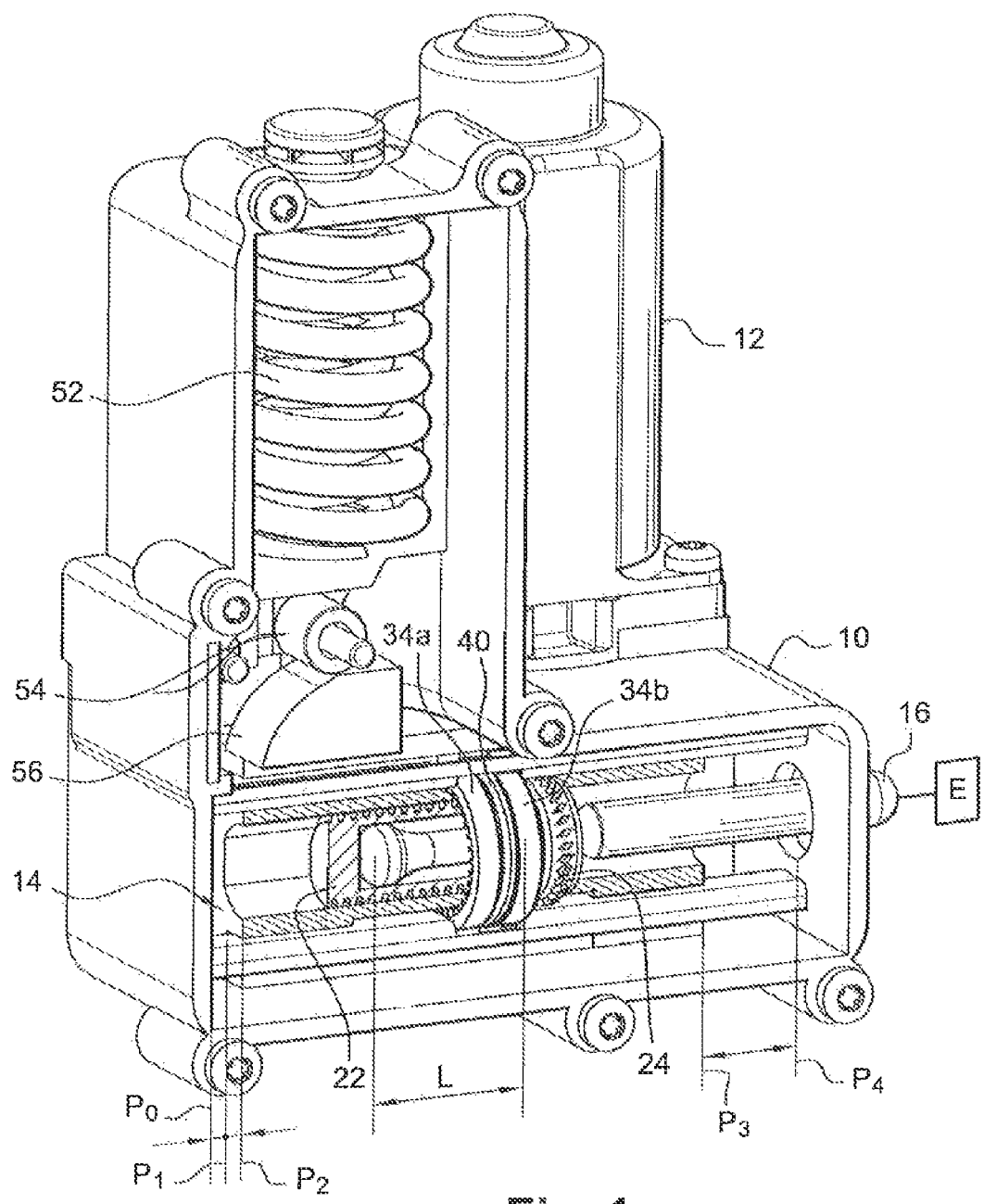
FIG. 1 is a schematic view in perspective in partial cutaway of an actuator in accordance with the invention.

The actuator shown in FIG. 1 is intended to be used for the operation of the clutch of a motor vehicle and comprises essentially a casing 10 on which is mounted an electric motor 12, the output shaft of which is connected by a reducing system and a rack (not shown) to a mobile element 14 that is guided and moved inside the casing 10 in a manner perpendicular to the axis of the electric motor 12, with the said mobile element acting through the intermediary of a pusher member 16 on a clutch system E, for example, on a clutch pressure plate.

Figure 2:
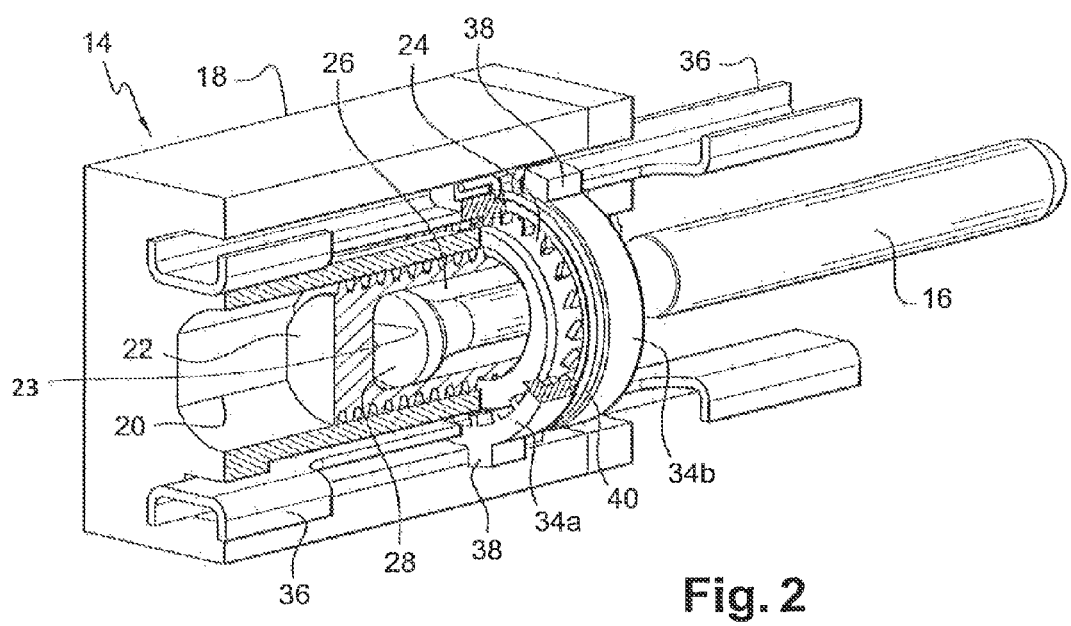
FIG. 2 is a larger scale view of the means of travel compensation of the actuator shown in FIG. 1.

The mobile element 14, which is better seen in FIG. 2, comprises essentially a slide element 18 activated by the electric motor 12 and is connected to the pusher member 16 by travel compensation means, which enables the axial displacement of the pusher member 16 caused by the wear sustained by the friction linings of the clutch to be compensated.

For this purpose, the slide element 18 has an axial passage 20 in which a screw 22 is moved and arrested in rotation, for example, by means of a flat piece formed on one side of the screw 22 and guided by a flat surface that corresponds to the passage 20.

The screw 22 is moved along the passage by the action of a nut 24, which is screwed onto the screw 22 and rotated in an annular housing of the slide element 18, with the rotation of the nut 24 in this housing being converted by the internal thread of the nut as it comes into contact with the outer thread of the screws 22 into an axial movement of the screw 22 inside the slide element 18.

The screw 22 is tubular in shape and comprises a cylindrical axial passage 26 opening out on the side of the pusher element 16 and closed at its other end by a base piece against a rear wall 23 of which is pressed a raised flat head-shaped section 28 formed at a distal end of the pusher member 16. In this way, an axial movement of the screw 22 inside the slide element 18 is translated by a variation of the visible length of the pusher member 16, thus allowing the axial displacement of the pusher element due to the wear sustained by the friction linings of the clutch to be compensated.

The nut 24 comprises a series of diamond shaped teeth 30 distributed around its surface (FIG. 3) and which is intended to work in conjunction with inner toothing 32 of two unidirectional drive rings 34a, 34b (FIG. 4), which are mounted in a limitedly rotational manner (FIG. 4) inside the slide element 18 are immobilised against any axial movement in relation to the casing 10.

These two rings are intended to be axially crossed by the nut 24 when the slide element 18 is displaced axially in one direction or the other by the electric motor 12 starting from an intermediary position P1 of its travel being defined between the positions P0 and P2, at which the bottom of the screw 22 is not pressing against the head-shaped section 28 of the pusher member 16 (FIG. 1).

The other path of travel of the slide element is defined by the positions P3 and P4 and corresponds to the displacement of the pusher member 16 for the opening and closing actions of the clutch.

The two unidirectional drive rings 34a and 34b mounted on the slide element 18 are associated with axial and angular supports 36 mounted on the casing 10, which limit the axial and the angular movements of these rings during the travel of the slide member 18, due to the stops or the teeth 38 projecting from the outer peripheries of the rings, coming to rest against the stops 38.

An annular return spring 40 is mounted between the two rings 34a and 34b and its ends come to rest against the outer stops 38 of these rings providing an angular separation between them. The outer toothing 30 of the nut 24 and the internal toothing 32 of the rings 34a, 34b are designed in such a way that they have the effect of turning the nut 24 one pitch through its axis when the nut is moved in one direction across a ring 34a or 34b and of not doing so when it is moved in the opposite direction across this ring 34a or 34b, as will be described below in greater details with the help of FIG. 5.

The diamond-shaped external teeth 30 of the nut 24 comprise two faces 42 that are parallel to the axis of the nut and two oblique faces 44 that are effectively parallel to each other and connect the two faces 42. The two faces 42 can be approximately flat. Ideally, the two surfaces 42 form helicoidal surfaces.

The internal teeth 32 of the rings 34a and 34b each comprise a first part 46 situated at the side of the nut, which is oblique in relation to the axis of the ring and a second part 48 on the other side of the nut, which is parallel to the axis of the ring. Similarly for the faces 42, the part 46 can be approximately flat. Ideally, this part is helicoidal in shape.

The first oblique parts 46 of the teeth 32 are parallel to the oblique faces 44 of the external teeth 30 of the nut 24.

Figure 5:
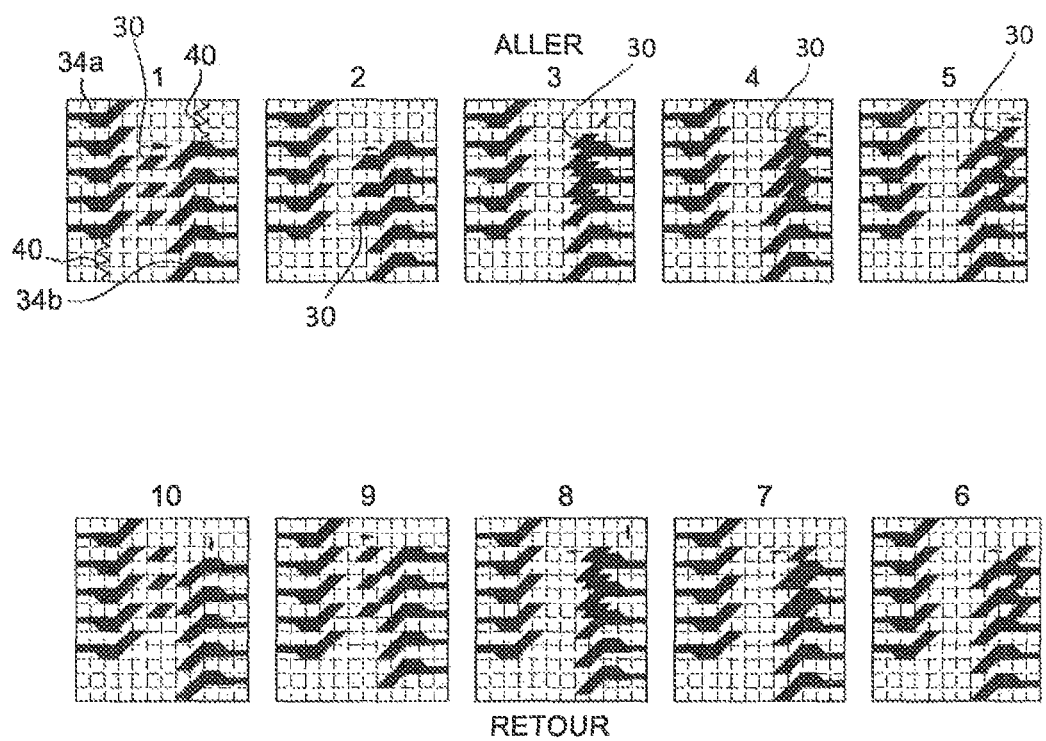
FIG. 5 is a schematic illustration of the operating stages of the means of travel compensation in accordance with the present invention.

Furthermore, the oblique parts 46 of the teeth of the ring 34a are orientated in the opposite direction of the oblique parts 46 of the teeth of the other ring 34b, as can be seen clearly in FIG. 5.

In this Figure, the different stages of the movement of the nut 24 in both directions in relation to the rings 34a and 34b from the intermediary position P1 are represented by the FIGS. 1 to 10.

In FIG. 5-1, the nut 24 is in the position P1 and its external teeth are in a mid-position between the rings 34a and 34b.

In FIG. 5-2, the nut 24 has been moved in the direction of the ring 34b, that is to say in the direction of the position P2, and its external teeth 30 come to rest against the ends of the oblique parts 46 of the teeth of the ring 34b. In this position, the ring 34b rests against a fixed stop 36 and cannot rotate around its axis in the direction marked by a downward pointing arrow in FIG. 5-2.

In FIG. 5-3, the nut 24 has again been moved in the direction of position P2 and its teeth 30, by sliding along the oblique parts 46 of the teeth of the ring 34b, have had the effect of turning the nut by one turn in the direction marked by an upward pointing arrow.

Figures 3, 4:
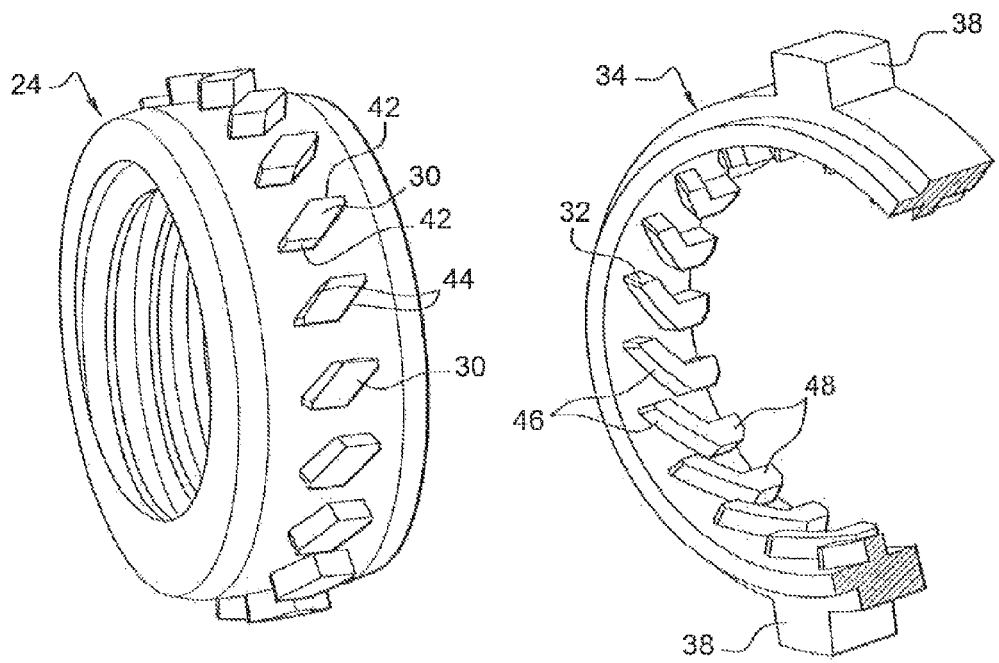
FIGS. 3 and 4 are schematic views in perspective and on a larger scale of a nut and a means of unidirectional movement of the means of travel compensation.

In FIG. 5-4, a rotation of one turn of the nut 24 has been effected, the teeth 30 of the nut have come to rest against the rectilinear parts 48 of the teeth the ring 34b and the displacement of the nut in the direction of the position P2 does not provoke any additional displacement of the nut.

Figure 6:
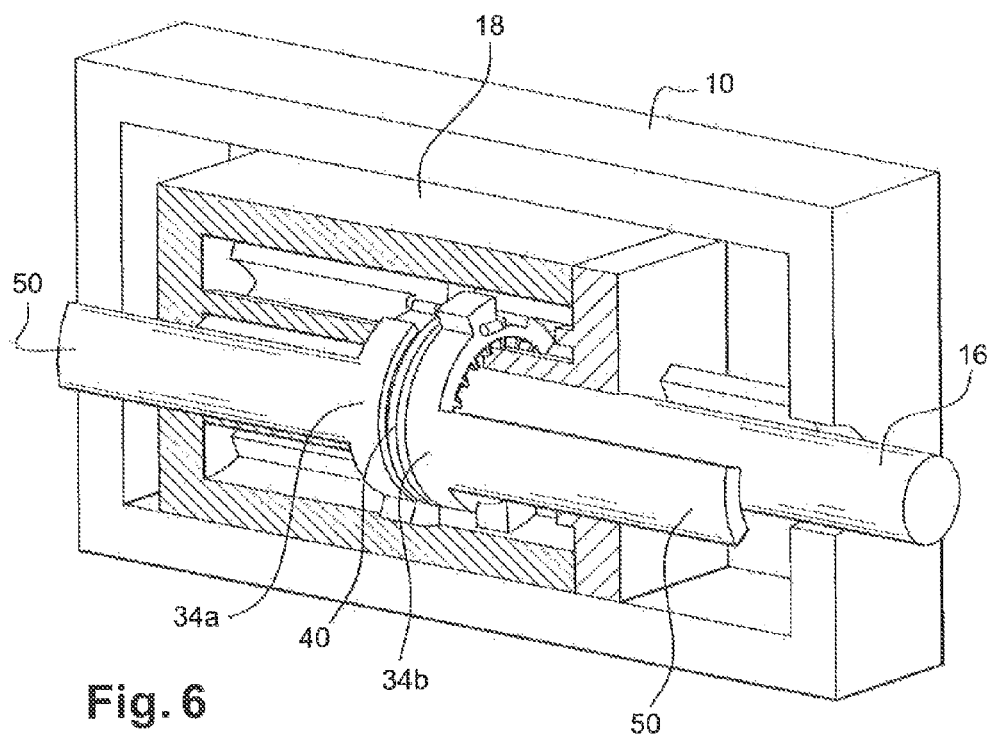
FIGS. 6 and 7 are schematic views in perspective illustrating an alternative embodiment of the invention.

When subsequently, as shown in FIG. 5-6, the nut 24 is displaced in the opposite direction and returned to the position P1, the displacement of its teeth 30 along the rectilinear parts 48 of the teeth of the ring 34b does not have the effect of provoking any rotation of the nut or the ring up to the position shown in FIG. 5-7.

As the displacement of the nut in the direction of the position P1 takes place, the teeth 30 of the nut come to rest against the oblique parts 46 of the ring 34b as shown in FIGS. 5-8 and induce this to turn in the direction marked by an upwards pointing arrow until the teeth 30 of the nut are released from the teeth of the ring 34b as shown in FIGS. 5-9 are reach the position shown in FIGS. 5-10, which corresponds to the position P1 of the nut.

When the teeth 30 of the nut 24 are released from the teeth 32 of the ring 34b, this latter is returned to its initial position by the return spring and then turns in the direction shown by the downward pointing arrow in FIGS. 5-10.

It can be seen that this outward and return movement of the nut 24 between the positions P1 and P2 has the effect of rotating the nut by one turn around its axis in a direction that is determined by the angle of inclination of the oblique parts 46 of the teeth of the ring 34b.

When the nut 24 is displaced in the other direction, that is to say between its positions P1 and P0, the other ring 34a makes it rotate by one turn in the other direction with each outward and return movement.

Each rotation of the nut 34 by one turn in one or the other direction is translated by an axial turn of the screw 22, in one direction or the other, in relation to the slide element 18 and thereby by a visible elongation or shortening of the pusher member 16.

By appropriately adjusting the fixed stops 36 which limit the axial and the angular travel of the rings 34a and 34b, the axial positions P0 and P2, which demarcate the adjustment path, can be defined in relation to the positions P3 and P4, which demarcate the drive path.

In the example shown schematically in FIG. 1, it can be seen that the slide member 18 can be displaced between its positions P0 and P2 without the position of the pusher member 16 being modified and that this adjustment path is separated from the path of the slide member along which it propels the pusher member 16.

The length L of the screw 22, which can be adjusted by screwing inside the nut, represents the path that can be compensated.

Preferably, in order to increase the visible length of the pusher member 16, the mobile element 14 is displaced in the direction of the return of the clutch. This enables the effort required for the adjustment to be reduced and standardised.

For this, it is also advantageous for the helicoidal surfaces of the thread of the screw 22 and the oblique parts of the rings 34a and 34b to be orientated in the same direction.

Figure 7:
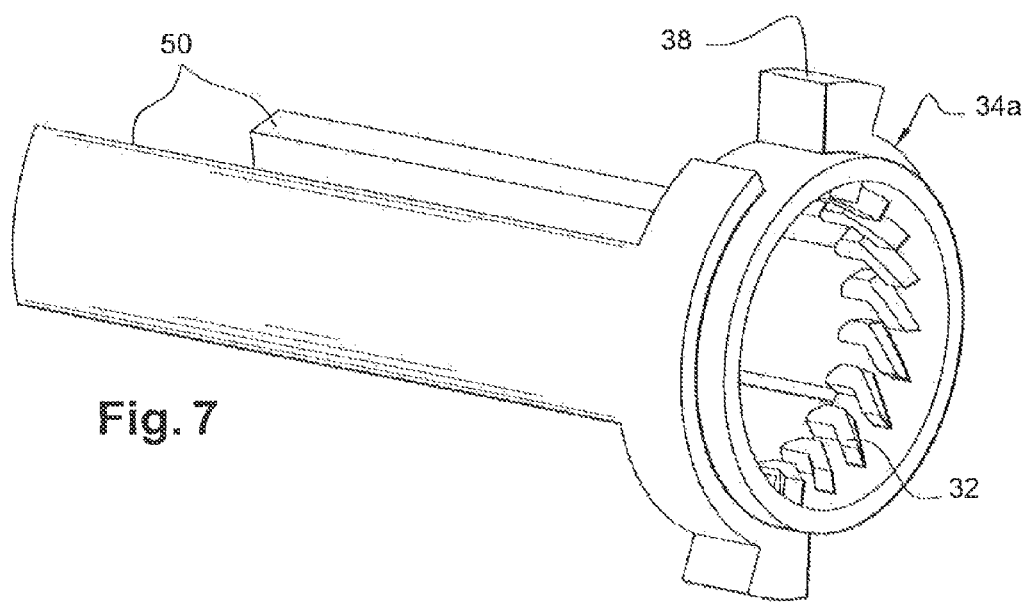

FIGS. 6 and 7 represent schematically an alternative embodiment, in which each ring 34a, 34b is an integral part of two longitudinal parallel legs enabling the device to be positioned correctly in relation to the slide member in the actuator casing.

The legs 50 of the ring 34a situated on the side opposite to the clutch extend from the side opposite the clutch, whereas the legs 50 of the ring 34b situated on the side of the clutch extend in the direction of the clutch.

The legs 50 are portions of a cylinder, as is clearly shown in FIG. 7, and can limit the amount of rotation and axial displacement of each ring 34a, 34b by means of stops on the actuator casing 10.

Furthermore, the actuator in accordance with the present invention is advantageously of the effort compensating type and comprises, as shown in FIG. 1, a compression spring 52 arranged in the casing 10 in a manner parallel to the motor and acting, through the intermediary of a rolling element 54, on an inclined ramp or on a cam 56 carried by the mobile element 14. The force exerted by the spring 52 on the mobile element forces the latter in the direction of the opening of the clutch, which has the effect of reducing the torque to be provided by the motor to operate the clutch.

The invention claimed is:

1. A travel compensation actuator for a clutch of a motor vehicle, comprising:
    a casing;
    a driving mechanism (16);
    a motor (12) mounted to the casing for driving the driving mechanism along an outward and a return path; and
    travel compensating means (14) for compensating travel of the driving mechanism and connecting the motor (12) to the driving mechanism (16);
    the travel compensating means (14) mounted to the casing (10) and displaceable inside the casing by the motor along an adjustment path (P0-P2) and along a drive path (P3-P4) of the driving mechanism (16);
    the travel compensating means comprising a slide element (18) displaceable within the casing (10) and driven by the motor (12) along the adjustment and drive paths, means (22, 24) for adjusting the position of a drive stop of the driving mechanism and two combined means (34a, 34b) for unidirectional travel of the drive stop;
    the position adjustment means carried by the slide element (18) and including a screw (22) defining the drive stop and a nut (24) screwed onto the screw (22) both mounted inside the casing (10);
    the two combined unidirectional travel means (34a, 34b) are mounted inside the casing (10) to cooperate with the position adjustment means (22, 24) in order to displace the position adjustment means (22, 24) by one step in one direction or the other when the travel compensating means (14) are displaced by the motor in one direction or the other from an intermediary position (P1) of the adjustment path;
    the position adjustment means (22, 24) mounted to the slide member (18) such that the screw (22) being linearly displaceable and non-rotatable in the slide member (18);
    the nut (24) being rotatable on the slide member and comprising an external teeth (30) cooperating with the two combined unidirectional travel means (34a, 34b) when the slide member (18) travels along the adjustment path.

2. The travel compensation actuator in accordance with claim 1, wherein the screw (22) is tubular in shape and a distal end of the driving mechanism (16) is engaged in an interior of the screw (22).

3. The travel compensation actuator in accordance with claim 2, wherein the distal end of the driving mechanism (16) is in the form of a head-shaped section that comes to rest against a rear wall of the screw (22).

4. Actuator The travel compensation actuator in accordance with claim 1, wherein, the slide member is displaced in the direction of the return of the clutch.

5. The travel compensation actuator in accordance with claim 1, wherein the adjustment and the drive paths of the travel compensating means are contiguous.

6. The travel compensation actuator in accordance with claim 1, wherein the travel compensation actuator further comprises at least one compensation spring (52) acting through the intermediary of a mobile element (54) on a cam (56) carried by the travel compensating means (14) and exerting a force on the travel compensating means in the direction corresponding to the opening of the clutch.

7. A travel compensation actuator for a clutch of a motor vehicle, comprising:
a casing;
a driving mechanism (16);
a motor (12) mounted to the casing for driving the driving mechanism along an outward and a return path; and
travel compensating means 14 for compensating travel of the driving mechanism and connecting the motor (12) to the driving mechanism (16);
the travel compensating means (14) mounted to the casing (10) and displaceable inside the casing by the motor along an adjustment path (P0-P2) and along a drive path (P3-P4) of the driving mechanism (16);
the travel compensating means comprising a slide element (18) displaceable within the casing (10) and driven by the motor (12) along the adjustment and drive paths, means (22, 24) for adjusting the position of a drive stop of the driving mechanism and two combined means (34a, 34b) for unidirectional travel of the drive stop;
the position adjustment means including a screw (22) defining the drive stop and a nut (24) screwed onto the screw (22) both mounted inside the casing (10);
the two combined unidirectional travel means (34a, 34b) are mounted inside the casing (10) to cooperate with the position adjustment means (22, 24) in order to displace the position adjustment means (22, 24) by one step in one direction or the other when the travel compensating means (14) are displaced by the motor in one direction or the other from an intermediary position (P1) of the adjustment path;
the position adjustment means (22, 24) mounted to the slide member (18) such that the screw (22) being linearly displaceable and non-rotatable in the slide member (18);
the nut (24) being rotatable on the slide member and comprising an external teeth (30) cooperating with the two combined unidirectional travel means (34a, 34b) when the slide member (18) travels along the adjustment path;
the combined unidirectional travel means comprising two unidirectional drive rings (34a, 34b) mounted in a rotational manner around the slide member (18) and having an internal teeth (32) intended to work in cooperating with the external teeth (30) of the nut (24), the two unidirectional drive rings engaging elastic means of return $(40)_3$ inducing the two unidirectional drive rings to rotate in opposite directions until the two unidirectional drive rings come to rest against stops formed on the slide member (18).

8. The travel compensation actuator in accordance with claim 7, wherein each of the internal teeth of the unidirectional drive rings (34a, 34b) is in the form of an open V and comprises a first an oblique part (46) that is oblique in relation to an axis of rotation of the ring and a rectilinear part (48) that is parallel to the axis of the ring, with the oblique parts (46) of the internal teeth of one of the unidirectional drive rings being parallel to the oblique parts (46) of the internal teeth of the other unidirectional drive ring and stretching in opposite directions.

9. The travel compensation actuator in accordance with claim 8, wherein the external teeth of the nut (24) are in the shape of a diamond and have two parallel faces (42) that are parallel to an axis of rotation of the nut and two oblique faces (44) that are oblique in relation to the axis of the nut, the oblique faces of the external teeth of the nut (24) being parallel to the oblique parts (46) of the internal teeth of the unidirectional drive rings (34a, 34b).

10. The travel compensation actuator in accordance with claim 9, wherein the oblique faces (44, 46) of the teeth of the nut and the rings are parallel to the thread of the screw (22) and orientated in the same direction.

11. The travel compensation actuator in accordance with claim 7, wherein the unidirectional drive rings (34a, 34b) comprise longitudinal legs (50) that cooperate with the casing (10) of the actuator to limit the longitudinal and angular displacement of the unidirectional drive rings.

* * * * *